Feb. 27, 1968   R. F. GREEN ET AL   3,370,879
CONNECTING MEANS FOR FRUIT HARVESTER
Filed May 25, 1967

United States Patent Office 3,370,879
Patented Feb. 27, 1968

3,370,879
CONNECTING MEANS FOR FRUIT HARVESTER
Richard F. Green, Stamford, Albert E. Anderson, North Greenwich, Randolph H. Dinter, Cos Cob, and Peter F. Romot, Byram, Conn., assignors to Textron, Inc., Providence, R.I., a corporation of Rhode Island
Filed May 25, 1967, Ser. No. 641,241
10 Claims. (Cl. 294—86)

ABSTRACT OF THE DISCLOSURE

A device for connecting a longitudinally oscillating shaft or boom of tree shaking apparatus to the limb of a tree comprises a unitary member having two side portions which are spaced apart to provide a recess between them and a connecting portion closing one end of the recess. The member is attached to the boom of tree shaking apparatus with the side portions disposed transversely of the axis of the boom. Pads of elastomeric material are provided on the inner faces of the side portions and at least one of the pads has ribs or fingers which project into the recess and are inclined toward the closed end of the recess so as to tend to move a limb received in the recess toward the closed end and thereby retain it in the recess during the shaking operation. Preferably the side portions of the member are offset relative to one another in a direction transverse to the axis of the boom to facilitate disengaging the device from a limb by swinging the lower end of the boom sideways. The side portion farthest from the boom preferably has an outer face which is concave and is covered with cushioning material so that it can be used to bump the limb of a tree, e.g., to remove only a portion of the fruit.

The invention relates to fruit harvesting apparatus of the kind that shakes a tree or a limb of a tree to remove fruit from the tree and is directed particularly to means for connecting a longitudinally oscillating shaft or boom of tree shaking apparatus to the limb of a tree. For convenience of description, the term "limb" is herein used to include both the branches and the stem or trunk of a tree.

A method used for harvesting fruit, e.g., cherries or nuts from trees, is to shake the tree or tree branch so that the fruit falls off. Apparatus for carrying out the method customarily comprises an elongated boom or shaft, a clamp at the upper end of the boom for attaching it to a tree limb and a power unit at the lower end of the boom for oscillating the boom in a generally lengthwise direction to shake the limb to which the boom is attached. Apparatus of this nature is shown, in Londo Patent No. 3,174,269.

With tree shaking apparatus of this kind, the attachment of the upper end of the boom to a limb of a tree presents rather difficult problems. It is desirable to provide a firm and secure connection so that the oscillating motion of the boom is effectively transmitted to the tree limb. This is of particular importance with small portable apparatus where the amount of power available for shaking the tree limb is limited. Various clamping devices have been proposed, but they have not been found satisfactory for the reason that they require moving parts which must ordinarily be operated by remote control since the tree limbs are out of reach of an operator on the ground. The severe shaking to which such a clamp is necessarily subjected during operation of the apparatus has been found to make it extremely difficult to keep the clamp in operative condition for any substantial period of time and to provide satisfactory remote control means capable of withstanding prolonged shaking. Moreover, it is highly important to provide connecting means which will not injure the bark of the limbs or otherwise damage the trees on which the harvester is used.

It is an object of the present invention to provide means for connecting a longitudinally oscillating boom of tree shaking apparatus to the limb of a tree in such manner as to provide a firm and effective connection without requiring movable parts or remotely controlled operating mechanism for applying the device to, or removing it from a tree limb. The elimination of movable parts not only avoids the difficulty heretofore experienced of providing suitable remotely controlled operating mechanism but also results in a simpler and more rugged and durable device. The connecting means in accordance with the invention is easily and quickly applied to the limb of the tree and, when applied, provides a secure connection so that the boom will not accidently become disengaged from the limb during operation. However, when the shaking operation has been completed, the boom is quickly and easily detached from the limb.

The connecting means in accordance with the invention has a further advantage that it avoids bruising or otherwise injuring the tree limb to which it is applied. Hence, tree shaking harvesting apparatus can be used repeatedly in a grove or orchard without damaging the trees.

The object and advantages of the invention will more fully appear from the following description of a preferred embodiment shown by way of example in the accompanying drawings.

Figure 2:
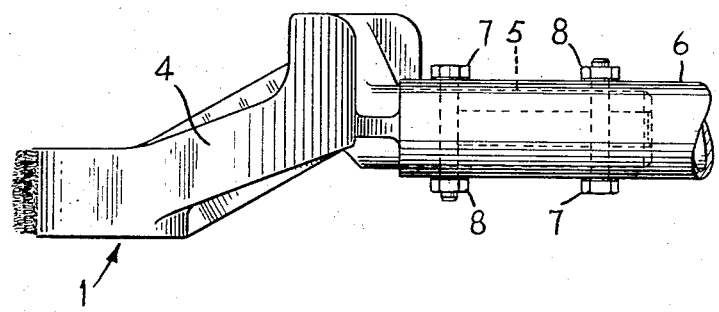
FIG. 2 is a top view of the connector.

As illustrated by way of example in the drawings, a connector in accordance with the invention for connecting a longitudinally reciprocating boom or shaft of tree shaking apparatus to the limb of a tree, comprises a member 1 having side portions 2 and 3 which are spaced apart to define a recess between them and a connecting portion 4 closing one end of the recess. In the preferred form shown in the drawings, the member 1 is generally V-shaped with the side portions 2 and 3 constituting opposite legs of the V.

The V-shaped member 1 is secured to the upper end of the boom of tree shaking apparatus in such a position that the legs 2 and 3 extend generally crosswise of the direction of reciprocation of the boom. In the embodiment illustrated in the drawings, the V-shaped member 1 is provided with a cylindrical arm portion 5 which projects from an intermediate portion of one of the legs 3 and is received snugly in an end of a tubular shaft 6 which constitutes the boom of the tree shaking apparatus. Transverse bolts 7 extend through aligned holes in the arm 5 and tubular shaft 6 and are secured by lock nuts 8. The connector member 1 is thereby secured to the shaft 6 but can be removed if desired, e.g., for replacement by a larger or smaller connector. Upon reciprocation of the shaft 6 in a longitudinal direction, the connector member 1 is moved back and forth in the direction indicated by the arrows in FIG. 1.

Figure 1:
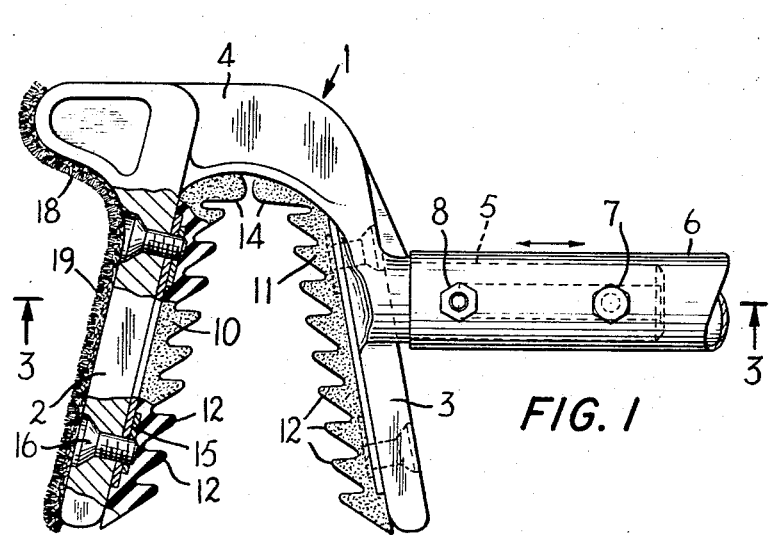
FIG. 1 is a side view of connecting means in accordance with the invention, portions being broken away and shown in section to illustrate the construction more clearly.

The legs 2 and 3 of the connector member 1 are preferably inclined relative to one another as illustrated in FIG. 1 so that the recess between the legs converges toward the end of the recess closed by the connecting portion 4. The angle of inclination is preferably of the order of 10° to 15°. On the inner faces of the legs 2 and 3, there are provided cushioning and engaging means in the form of pads 10 and 11 formed of elastomeric or rubber-like material. At least one of the pads is provided with a plurality of fingers which project into the recess between the legs and are inclined toward the closed end of the recess so that when the connector is reciprocated in a direction indicated by the arrows in FIG. 1, a tree limb received in the recess will be engaged by the fingers and will be retained in the recess. Preferably both of the pads 10 and 11 are provided with inwardly projecting fingers 12 as clearly shown in FIG. 1. It will be seen that these fingers are in the form of ribs or ridges which extend transversely the full width of the pads 10 and 11. The inner face of each rib is approximately parallel to the axis of the shaft 6 while the outer face of each rib 12 is inclined. Preferably the ribs on pads 10 and 11 are offset relative to one another so that the ribs of one pad are approximately opposite the spaces between ribs of the other pad. Inner end portions 14 of the pads project toward one another and provide a cushion for the connecting portion 4 between the legs.

The firmness of the rubber material forming the cushioning and engaging pads 10 and 11 is selected according to the use for which the connector is intended. When it is to be used on limbs of trees having easily damaged bark, a softer rubber composition is preferably used while a firmer material can be used for trees having tougher bark. For most applications, the elastomeric material of the pads 10 and 11 has a durometer between 30 and 70. Moreover, the pads 10 and 11 are preferably removable so as to permit their replacement in case they become worn or damaged or if it is desired to replace pads of one hardness by those having a different hardness. To facilitate removal and replacement of the pads, they are shown provided with metal or plastic inserts 15 which are molded into the pads and provided with tapped holes to receive screws 16 inserted through holes in the legs 2 and 3.

Figure 4:
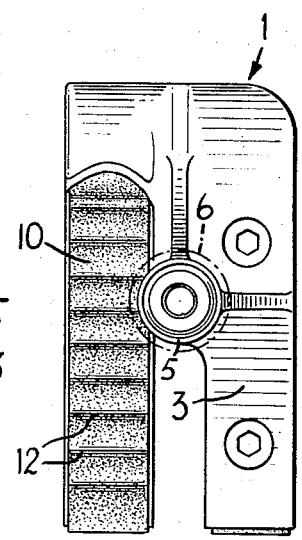
FIG. 4 is a side view looking at the connector from the right hand side of FIG. 1.
Figure 3:
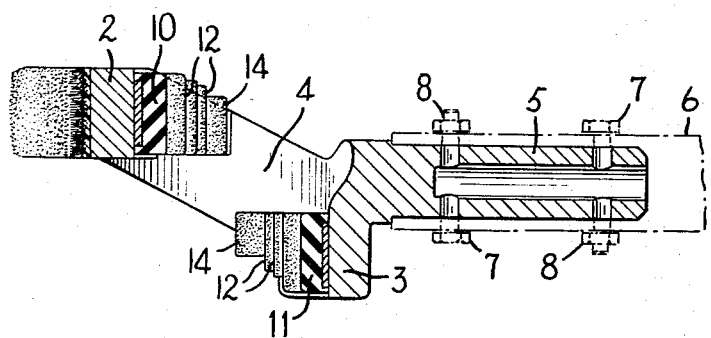
FIG. 3 is a sectional view taken approximately on the line 3—3 in FIG. 1.

To facilitate removal of the connector from a tree limb after the shaking operation has been completed, the legs 2 and 3 are preferably offset laterally from one another as clearly seen in FIGS. 2, 3 and 4. By reason of this offset relation of the legs, the connecting portion 4 is disposed at an angle to the axis of the boom as is apparent in FIGS. 2 and 3. By reason of the offset relationship of the legs 2 and 3, the connector can be easily and quickly released from the limb of a tree by swinging the lower end of the boom sideways. With reference to FIG. 3, the tree limb would normally be approximately perpendicular to the axis of the shaft 6 during the shaking operation. When it is difficult to remove the connector from the tree limb, the lower end of the shaft 6 may be swung in a direction to rotate the connector in a counterclockwise direction as viewed in FIG. 3 until the connecting portion 4 of the connector is approximately perpendicular to the tree limb. This results in increasing the effective distance between the legs 2 and 3 in a direction perpendicular to the tree limb and thereby releases the connector from the limb so that the connector can readily be lifted off the limb.

The cylindrical arm portion 5 for attaching the connector member 1 to the shaft 6 of tree shaking apparatus is offset laterally with respect to the leg 3 from which it projects (see FIGS. 2, 3 and 4) so that the axis of the shaft 6 passes approximately between the two legs. Moreover, the projecting arm portion 5 is approximately midway between the top and the bottom of the connector member 1 as seen in FIGS. 1 and 4. This arrangement provides an essentially balanced structure in which torsional forces on the connector are minimized.

In use, the connector—secured to the end of the boom 6 as shown—is applied to the limb of a tree from above so that the limb is received in the recess between the legs 2 and 3. By reason of the convergence of these legs towards the closed end of the recess, the limb will be received a greater or lesser distance in the recess according to its size. The tree shaking unit is then put into operation to reciprocate the boom 6 in a lengthwise direction. This movement is transmitted through the connector 4 to the tree branch to shake the branch and thereby dislodge the fruit. During the shaking operation, the fingers 12 of the pads 10 and 11 engage themselves on the tree limb and prevent the connector from becoming dislodged. Morevore, during oscillation of the connector, the fingers 12 tend to cause the tree limb to move farther toward the closed end of the recess so as to be engaged still more firmly. In case the branch is small enough to pass all the way to the closed end of the recess, the inner end portions 14 of the pads 10 and 11 protect the branch from being damaged by contact with the connecting portion 4 between the legs. When the shaking operation is completed, the lower end of the boom may be swung sideways as described above so as to release the connector from the limb.

In some instances, it may be desired to bump or jar the limb of a tree slightly instead of shaking it vigorously. This may be the case, for instance, when it is desired to thin peaches or other fruit early in the growing season so that a tree will produce larger fruit. To facilitate such a bumping or jarring operation, the outer leg portion 2 of the connector is provided with a concave outer face 18 which is preferably padded, e.g., with nylon carpeting 19. The concave and cushioned outer face of the connector is adapted to be held against the limb of a tree while the tree shaking unit is operated—usually very briefly—to jar the limb to the extent desired, e.g., to shake off only a portion of the fruit on the limb.

The connector including the legs 2 and 3, connecting portion 4 and the cylindrical arm portion 5 for attaching the connector to the boom 6 of tree shaking apparatus is preferably formed as an integral member, e.g., by being cast or molded to the desired shape from a strong lightweight material such as magnesium or a plastic material. By virtue of this one piece construction, the unit is inexpensive to manufacture and has the further advantage that it is lightweight so as to minimize the load on the power unit for oscillating the boom and the connector carried by it. Moreover, the light weight of the unit makes it easier for an operator to manipulate the unit in applying it to and removing it from the limb of a tree.

While a preferred embodiment of the invention has been illustrated in the drawings and is herein particularly described, it will be understood that modifications in size, shape and proportions within the scope of the appended claims may be made.

What we claim is:

1. Means for connecting a longitudinally oscillating shaft of tree shaking apparatus to the limb of a tree, comprising a member having opposite side portions spaced apart from one another to define a recess between them and a connecting portion closing one end of said recess, means for attaching said member to said shaft with said side portions extending transversely of said shaft and means on the inner faces of said side portions for gripping a tree limb and cushioning the force applied to shake the limb, said engaging and cushioning means comprising elastomeric material and the engaging and cushioning means on at least one said side portion comprising a base portion and a plurality of fingers projecting into said recess and inclined toward the closed end of said recess so as to tend to move a limb received in said recess toward the closed end of the recess as said member is oscillated by said shaft.

2. Connecting means according to claim 1, in which said engaging and cushioning means on both of said side portions comprises a base portion and a plurality of fingers projecting into said recess.

3. Connecting means according to claim 2, in which said engaging and cushioning means on opposite sides of said recess are offset relative to one another to position fingers on one side of the recess opposite the spaces between fingers on the opposite side of the recess.

4. Connecting means according to claim 1, further comprising cushioning means on the inner face of said connecting means closing one end of said recess.

5. Connecting means according to claim 1, in which inner faces of said side portions are inclined relative to one another, the distance between said inner faces decreasing toward the closed end of said recess.

6. Connecting means according to claim 1, in which said member is generally V-shaped, with said side portions defining legs of the V.

7. Connecting means according to claim 6, in which said means for attaching said member to said shaft is located intermediate the ends of one of said legs of the V.

8. Connecting means according to claim 6, in which the legs of said V-shaped member are laterally offset relative to one another in a direction transverse to said legs and to said shaft, to facilitate releasing said connecting means from a limb.

9. Connecting means according to claim 8, in which said means for attaching said member to said shaft is located intermediate the ends of one of said legs and is offset inwardly relative to said leg on which it is located, whereby an extension of the axis of said shaft passes between said legs.

10. Connecting means according to claim 1, in which said member has a cushioned concave outer face extending transversely to said shaft and engageable with a limb of a tree to bump said limb when said member is oscillated by said shaft.

References Cited

UNITED STATES PATENTS 3,084,967   4/1963   Harrett _____ 294—86
3,206,919   9/1965   Read _____ 56—328

EVON C. BLUNK, *Primary Examiner.*

R. D. GUIOD, *Assistant Examiner.*